United States Patent [19]

Neugebauer et al.

[11] 3,781,831

[45] Dec. 25, 1973

[54] READ ONLY MEMORY UTILIZING FLOATING GATE TRANSISTORS AND METHOD OF PROGRAMMING

[75] Inventors: Constantine A. Neugebauer; Joseph L. Mundy, both of Schenectady, N.Y.

[73] Assignee: General Electric Company, Schenectady, N.Y.

[22] Filed: June 30, 1972

[21] Appl. No.: 267,968

[52] U.S. Cl. .............. 340/173 R, 307/238, 307/279
[51] Int. Cl. .............................................. G11c 11/40
[58] Field of Search .................. 340/173 R; 307/238

[56] References Cited

UNITED STATES PATENTS 3,500,142 3/1970 Kahng ................................ 340/173

*Primary Examiner*—Terrell W. Fears
*Attorney*—John F. Ahern et al.

[57] ABSTRACT

A read only memory cell comprising a floating gate field effect transistor as the storage element is disclosed. Low operating voltages are used by including metal-oxide-semiconductor (MOS) varactors in the cell, enabling one to selectively induce avalanche injection for storing charge at selected bit sites.

8 Claims, 3 Drawing Figures

READ ONLY MEMORY UTILIZING FLOATING GATE TRANSISTORS AND METHOD OF PROGRAMMING

This invention relates to memory cells and, in particular, to memory cells comprising floating gate transistors.

Non-volatile (i.e., the information survives when no power is supplied to the circuit) read only memories uitilizing foating gate field effect transistors are known in the prior art. Electrons are stored on the floating gate using high voltage and power levels. Erasure is accomplished by exposing the device to high energy radiation, e.g., ultraviolet light or x-rays. In general, the device cannot be programmed within the memory, but must be removed and programmed externally using a separate programmer.

Specifically, in storing electrons on the floating gate, the input voltage levels are in excess of the avalanche breakdown voltage. This results in junction breakdown in a large portion of the circuit as well as considerable heating.

In view of the foregoing, it is therefore an object of the present invention to provide a memory cell utilizing floating gate field effect transistors and capable of being programmed in situ.

A further object of the present invention is to provide a floating gate memory cell using low level input voltages for programming.

Another object of the present invention is to provide a floating gate memory in which avalanche injection of charge takes place only at selected locations.

A further object of the present invention is to provide a floating gate memory utilizing avalanche injection of charge but requiring less power for programming.

The foregoing objects are achieved in the present invention wherein MOS voltage variable capacitors are used in injecting charge onto the floating gate storage node of the memory cell. One plate of the capacitor is pre-charged to raise it to the high capacitance state, and the input signal on the other plate is coupled through the capacitor so that the voltages additively combine, thereby exceeding the avalanche breakdown voltage of the floating gate transistor. Selectively is obtained in precharging only selected voltage variable capacitors.

Figure 1:
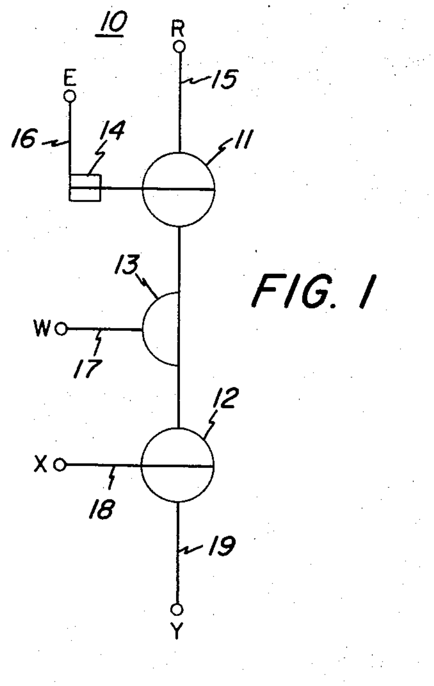
Figure 2:
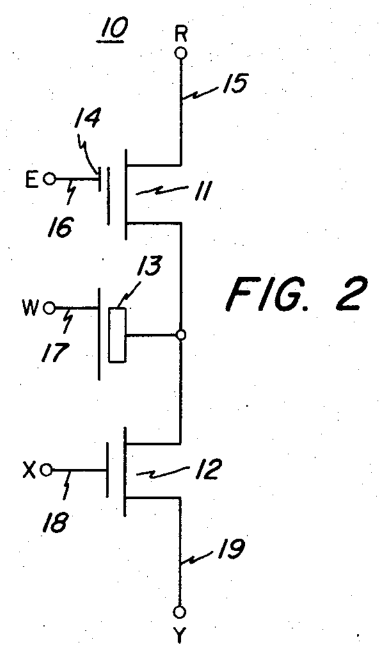
Figure 3:
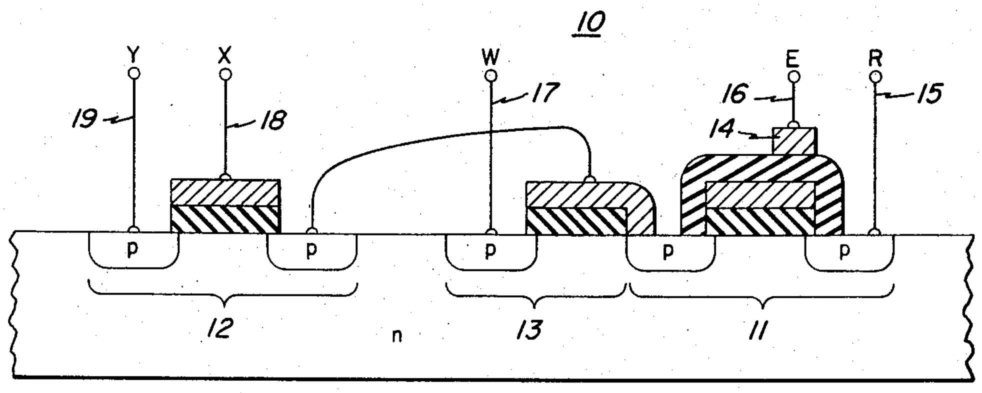

A more complete understanding of the present invention can be obtained by considering the following detailed description in conjunction with the accompanying drawings, in which:

FIGS. 1, 2 and 3 illustrate, in different formats, a relatively simple memory cell in accordance with the present invention.

In the following detailed description, reference may be made to any one of FIGS. 1, 2 or 3 in which the same reference numeral has been used for the same element. FIG. 1 illustrates the present invention in what is known as "bubble" symbolism. This symbolism is receiving increased usage and enables one to easily illustrate large logic arrays. FIG. 2 illustrates the present invention in more or less conventional electrical symbols for field effect transistors. FIG. 3 illustrates the present invention as it might appear in cross-section on a semiconductor chip if the circuit of FIGS. 1 and 2 were fabricated on the chip without regard for conserving chip area.

Memory cell 10 comprises two field effect transistors 11 and 12 and a voltage variable capacitance element 13 which comprises one electrode and an enlarged gate of a field effect transistor. A more detailed description of the construction and operation of this device is given in application Ser. No. 146,966, filed May 26, 1971 and assigned to the assignee of the present invention. Briefly stated however, voltage variable capacitor element 13 comprises one diffused source region and channel and gate structure. The gate structure provides one plate of a capacitor. The other plate of the capacitor is formed by an inversion layer when the gate voltage exceeds the threshold voltage of forming an inversion layer in the underlying channel. However, if the threshold voltage is not exceeded on the gate electrode, then no inversion layer exists under the gate structure of the voltage variable capacitor. Thus, the capacitance associated with voltage variable capacitor 13 is greatly reduced and very little of any applied signal is coupled therethrough.

By virtue of voltage variable capacitor 13, signals may be selectively coupled to the series connected source-drain paths of field effect transistors 11 and 12. The gate of transistor 11 is a "floating" gate, that is, there is not resistive path to the gate electrode. The floating gate of transistor 11 thus forms the storage of memory cell 10. Transistor 12 acts as an isolation transistor so as to enable selection, in an array of memory cells such as memory cell 10, in which of the memory cells the storage node is to be charged or interrogated to determine the contents thereof.

It will be noted from FIG. 3 that memory cell 10 as illustrated as comprising p-channel field effect transistors. It should be understood that n-channel field effect transistors are equally suitable for the present invention. It should also be noted that the terms "source"and "drain" as used herein are somewhat arbitrary in that field effect transistors are generally symmetrical devices and whether an electrode forms the source or the drain is generally determined by the potential applied thereto. The convention has been generally adopted that the electrode with the lower potential is the source electrode. With respect to voltage variable capacitor 13, which has only one electrode in the substrate, this electrode may be considered either the source or the drain.

The source of transistor 11 is connected to access line R by lead 15. The drain of transistor 11 is connected to the source of transistor 12 which in turn has its drain connected by way of lead 19 to select line Y. The source of voltage variable capacitor 13 is connected by way of lead 17 to access line W. The gate of transistor 12 is connected by way of lead 18 to select line X. Floating gate field effect transistor 11 has applied over a portion of the gate thereof an erase gate 14 which is coupled to access line E by lead 16. As best seen in FIG. 3, erase gate 14 comprises an insulating layer and a metal layer overlying the floating gate of transistor 11.

In considering the operation of the present invention, it would perhaps be fruitful to contrast the operation of memory cell 10 with the operation of a memory cell in the prior art. Assuming that voltage variable capacitor element 13 is absent from memory cell 10 and that erase gage 14 is absent from the gate of transistor 11 then one has basically a memory cell as would be formed by the floating gate transistor of the prior art.

Assuming that the storage of charge on the gate of transistor 11 corresponds to a logic 1, then one writes a 1 into storage node by avalanche injection of charge from ths substrate to the gate electrode. In the prior art, this is accomplished by applying large negative pulses to leads 18 and 19. The application of a large negative pulse to these electrodes causes the accumulation of electrons at the p-n junction underlying the gate of transistor 11. Assuming a sufficiently large pulse is utilized, for example, on the order of 40 or 50 volts, then electrons are avalanche injected through the insulating layer into the gate layer of transistor 11.

However, as previously noted, the application of such pulses requires a relatively large amount of power and produces substantial heating within the memory array.

In accordance with the present invention, the gate of voltage variable capacitor 13 is precharged to a potential of approximately one-half the avalanche injection voltage. In order to write the same logic 1, a negative pulse of approximately one-half the avalanche injection voltage is applied from lead 17 to the source of voltage variable capacitor 13. By capacitative coupling through voltage variable capacitor 13, the percharge voltage and the applied voltage on lead 17 approximately additively combine on the gate of capacitor 13, so as to exceed the avalanche injection voltage of transistor 11. The avalanche injection voltage is reached only at the selected transistors and nowhere else in the circuit. Thus, the voltages required are greatly reduced and, in addition, less power is required in order to drive transistor 11 into avalanche.

If voltage variable capacitor 13 were not in the high capacitance state, then little if any of the applied pulse would be coupled therethrough to the drain of transistor 11. Thus only the selected precharged storage transistors have large pulses applied thereto. This is to be contrasted to the situation as would obtain with a memory cell of the prior art if a logic 1 were not to be written in that particular memory cell. In this case a large negative pulse is applied only to lead 19 and not to lead 18, or vice versa. However, the large negative pulse applied to lead 19 may cause avalanche injection indiscriminately in all transistors connected to this line.

Voltage variable capacitor 13 is selectively raised to the high capacitance state by the selection of the X and Y address of only that particular voltage variable capacitor. Thus if a logic 1 were to be written in memory cell 10, leads 18 and 19 are pulsed with a low voltage pulse, on the order of 20 or 25 volts (below the avalanche voltage), thereby connecting the gate electrode of voltage variable capacitor 13 to the negative potential on lead 19. This voltage causes an inversion layer to form under the gate electrode of voltage variable capacitor 13 and charges voltage variable capacitor 13 to approximately the voltage on lead 19. Following the application of the selection pulses a writing pulse of also 20–25 volts is applied to lead 17 which, as described above, serves to write a logic 1 on the storage node of the memory cell, that is the gate electrode of transistor 11. Lead R is kept near or at zero potential with respect to X, Y, and W.

It will be noted that the writing operation draws charge from the drain of transistor 11 and consequently from the gate electrode of voltage variable capacitor 13. The withdrawal of charge from the plates of a capacitor reduces its voltage. Thus a point will be reached at which voltage variable capacitor 13 does not have a sufficient potential to maintain avalanche in transistor 11. The writing operation thus is self-terminating. Thus, depending upon the capacitance of voltage variable capacitor 13, several write pulses may be necessary to bring the gate of transistor 11 above the threshold for forming an inversion layer. For example, if the gate electrode of voltage variable capacitor 13 occupies 0.7 square mils, about 1,000 pulses may be needed to write one bit for typical transistor dimensions. For a 1 megahertz write frequency it would thus take one second to write 1,000 bits consecutively. If the voltage variable capacitor is larger, a correspondingly smaller number of pulses is needed.

As more fully described in copending application Ser. No. 267,969, filed concurrently herewith and assigned to the assignee of the present inventon, memory cell 10 can be erased. Erasure takes place by applying a large positive potential on lead 16. This positive potential causes high field conductive effects in the underlying insulating layer and enables the electrons stored on the gate of transistor 11 to be conducted through the insulating layer to erase gate 14. In order to reduce undesirable capacitive effects, erase gate 14 is made smaller than the floating gate electrode of transistor 11. Other methods for storing and removing charge from a floating gate electrode as described in the above-noted copending application may also be utilized in conjunction with memory cell 10.

Interrogating memory cell 10 to determine the contents thereof can be readily accomplished by selecting the X-Y address of memory cell 10 and applying small negative pulses to the gate and drain of transistor 12. If transistor 11 stores a logic 1, and is in a conductive condition, then the negative potential of access line Y is coupled by way of lead 15 to access line R thereby providing an indication of the content of memory cell 10. If a logic 0 is stored, then no conductive path exists between access lines R and Y.

Having thus described the present invention, it will be apparent to those skilled in the art that various modifications can be made within the spirit and scope of the present invention. For example, as previously noted, n-channel field effect transistor devices can be utilized in carrying out the present invention.

What we claim as new and desire to secure by Letters Patent of the United States is:

1. A memory cell comprising:

a floating gate field effect transistor;

a voltage variable capacitor comprising a gate electrode and a drain electrode, said gate electrode being connected to the drain of said floating gate field effect transistor; and at least two access lines, one of said access lines connected to the source of said floating gate field effect transistor, a second of said access lines connected to the drain of said voltage variable capacitor.

2. The memory cell as set forth in claim 1 and further comprising:

means for raising said voltage variable capacitor to a high capacitance state to cause said voltage variable capacitor to couple signals from said second access line to the drain of said floating gate field effect transistor.

3. The memory cell as set forth in claim 2 wherein said means for raising said voltage variable capacitor to a high capacitance state comprises:

third and fourth access lines;

another field effect transistor having the gate thereof connected to said third access lines and the source-drain path thereof interconnecting the drain of said floating gate field effect transistor and said fourth access line.

4. The memory cell as set forth in claim 3 wherein said floating gate field effect transistor further comprises an erase gate overlying a portion of said floating gate.

5. The memory cell as set forth in claim 1 wherein said floating gate field effect transistor further comprises an erase gate overlying a portion of said floating gate.

6. A method for selectively transferring charge to floating gate storage nodes in a memory array comprising memory cells containing floating gate field effect transistors comprising the steps of:

providing each memory cell with a voltage variable capacitor connected to the source-drain path of said floating gate field effect transistor;

raising selected ones of said capacitors to the high capacitance state to cause a potential difference to exist across the selected capacitors; and applying a voltage less than the avalanche voltage of said floating gate field effect transistor to at least said selected capacitors to couple said voltage to the source-drain paths connected thereto.

7. The method as set forth in claim 6 wherein said potential difference is equal to or greater than approximately one-half the voltage necessary for avalanche injection and said voltage is equal to or less than approximately one-half the voltage necessary for avalanche injection.

8. The method as set forth in claim 6 wherein said activating and applying steps are repeated until the selected floating gates are sufficiently charged to induce a channel to form between the source and drain electrodes of the selected floating gate field effect transistors.

* * * * *